United States Patent Office 2,973,366
Patented Feb. 28, 1961

2,973,366

DERIVATIVES OF THIAZOLIDINONES AND OXAZOLIDINONES AND CORRESPONDING THIONES WITH ALPHA-HALO OXO COMPOUNDS AND PROCESS

Russell M. Bimber, Painesville, Ohio, assignor to Diamond Alkali Company, Cleveland, Ohio, a corporation of Delaware No Drawing. Filed Oct. 17, 1957, Ser. No. 690,620

12 Claims. (Cl. 260—306.7)

This invention relates to compounds of the structure:

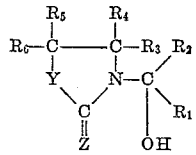

wherein Z and Y are selected from the group consisting of oxygen and sulfur; $R_1$ and $R_2$ are selected from the group consisting of hydrogen and haloalkyl radicals; $R_3$, $R_4$, $R_5$, and $R_6$ are selected from the group consisting of hydrogen atoms, alkyl radicals, such as methyl, ethyl, propyl, butyl; aryl radicals, such as phenyl radicals, thienyl; aralkyl radicals, such as phenyl substituted methyl radicals; alkaryl radicals, such as tolyl and xylyl radicals; and substituted derivatives of the same, especially halogen-substituted derivatives, i.e., chlorine, fluorine, bromine, and iodine substituted derivatives, each of which groups preferably has no more than 10 carbon atoms; and the method of preparing and using the foregoing.

More specifically, this invention deals with compounds of the structure:

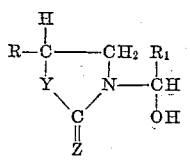

wherein Y and Z are selected from the group consisting of oxygen and sulfur; R is selected from the group consisting of hydrogen atoms, alkyl radicals, aralkyl radicals, alkaryl radicals, aryl radicals, haloalkyl radicals, and substituted derivatives of the same, each of which groups has no more than 10 carbon atoms; and $R_1$ is a haloalkyl radical such as trichloromethyl, 1,1,2-trichloropropyl, tribromomethyl, 1-chloropropyl, and 1-chloroethyl.

Specific illustrative compounds of the invention are:

3-(2,2,2-trichloro-1-hydroxyethyl) - 5 - methyloxazolidin-2-one,
3-(2,2,2-trichloro-1-hydroxyethyl)-thiazolidine-2-thione,
3-(2,2,2-trichloro-1-hydroxyethyl)-5 - methyloxazolidine-2-thione,
3-(2,2,2-trichloro-1-hydroxyethyl)-5 - methylthiazolidine-2-thione,
3-(2,2,2-tribromo-1-hydroxyethyl)-5 - methylthiazolidine-2-thione,
3-(2,2,2-trichloro-1-hydroxyethyl)-5 - phenyloxazolidine-2-thione,
3-(2,2,2-tribromo-1-hydroxyethyl)-oxazolidin-2-one,
3-(2,2,2-triiodo-1-hydroxyethyl)-5-methyloxazolidine - 2-thione,
3-(2-bromo-2,2-dichloro-1-hydroxyethyl)-oxazolidine - 2-thione,
3-(2,2,3-trichloro-1-hydroxybutyl)-thiazolidine-2-thione,
3-(2,2,3-trichloro-1-hydroxy) - 5 - methyloxazolidine - 2-thione,
3-(2,2,3-trichloro-1-hydroxybutyl)-oxazolidin-2-one.

Compounds of this invention are prepared by means of the following generalized reaction:

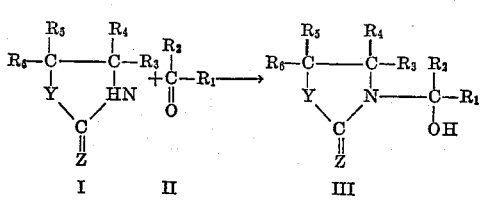

wherein Z and Y are selected from the group consisting of sulfur and oxygen; $R_1$, $R_2$, $R_3$, $R_4$, $R_5$, and $R_6$ are selected from the group consisting of hydrogen atoms, alkyl radicals, alkaryl radicals, aralkyl radicals, aryl radicals, and substituted derivatives of the same, preferably halogen substituted, each of which groups preferably has no more than 10 carbon atoms.

More specifically the process of this invention is carried out by reacting the above compounds I with an alpha-haloaldehyde, preferably chloral. In some instances the reaction may be more easily effected by bringing the two reactants together in the presence of a solvent, such as benzene, chloroform, heptane, or trichlorobenzene. Typically the reaction is exothermic and needs no great amount of energy for initiation.

Specifically representative of the above reaction is the preparation of 3-(2,2,2-trichloro-1-hydroxyethyl)-5-methyloxazolidin-2-one: 1 mol of monoisopropanolamine and 1 mol of urea are heated until 2 mols of ammonia are given off yielding 5-methyloxazolidin-2-one which is then combined with 1 mol of chloral. The reaction is exothermic and cooling is desirable while combination occurs. Reaction temperature is preferably kept below the reflux temperature of chloral. Typically the reaction product is purified, preferably through crystallization using an organic solvent, such as chloroform, petroleum ether, or carbon tetrachloride resulting in a white crystalline product melting at 134°–136° C.

Another reaction of the above type is the preparation of 3-(2,2,2-trichloro-1-hydroxyethyl) - 5 - methylthiazolidine-2-thione which comprises reacting 1 mol of monoisopropanolamine with 2 mols of carbon disulfide typically in the presence of aqueous sodium hydroxide resulting in 5-methylthiazolidine-2-thione, 1 mol of which is then reacted with 1 mol of chloral, giving a white crystalline product. As mentioned previously, the reaction temperature is preferably retained below the reflux temperature of chloral. Purification of the reaction product is desirable, typically through crystallization using an organic solvent such as benzene, resulting in a pure compound melting at 104°–105° C.

Still other reactions falling within the scope of this invention are (1) the preparation of 3-(2,2,2-trichloro-1-hydroxyethyl)-5-methyloxazolidine-2-thione, which comprises reacting equimolar amounts of 5-methyloxazolidine-2-thione and chloral, (2) the preparation of 3-(2,2,2-trichloro-1-hydroxyethyl)-thiazolidine-2-thione, which comprises reacting equimolar amounts of thiazolidine-2-thione and chloral, and (3) the preparation of 3-(2,2,3-trichloro-1-hydroxybutyl)-thiazolidine-2-thione, which comprises reacting equimolar amounts of thiazolidine-2-thione and butyl chloral.

The compounds of this invention are useful in the fields of pharmaceuticals, chemical intermediates, and also show biological activity, such as the control of microorganism growth, e.g., protection of tomato foliage against blight fungi, inhibition of spore germination, and the prevention of weed seed development. While compounds of this invention may be employed in a variety of applications, biologically active or otherwise, when employed as biologically active materials, it will be understood, of course, that such compounds may be utilized in diverse formulations, both liquid and solid, including finely-divided powders and granular materials as well as liquid, such as solutions, concentrates, emulsifiable concentrates, slurries, and the like, depending upon the application intended and the fromulation media desired. Thus, it will be appreciated that compounds of this invention may be employed to form biologically active substances containing such compounds as essential active ingredients thereof, which compositions may also include finely-divided dry or liquid diluents, extenders, fillers, conditioners, including various clays, diatomaceous earth, talc, spent catalyst, alumina silica materials and incorporating liquid solvents, diluents, etc., typically, water and various organic liquids such as kerosene, benzene, toluene, and other petroleum distillate fractions or mixtures thereof.

When liquid formulations are employed, or dry materials prepared which are to be used in liquid form, it is desirable in certain instances additionally to employ a wetting, emulsifying or dispersing agent to facilitate use of the formulation, e.g., Triton X-155 (alkyl aryl polyether alcohol, U.S. Patent 2,504,064).

The term "carrier" as employed in the specification and claims is intended to refer broadly to the material constituting a major proportion of a biologically active or other formulation and hence includes finely-divided materials, both liquids and solids, as aforementioned, conventionally used in such applications.

In order that those skilled in the art may more completely understand the invention and the preferred methods by which the same may be carried into effect, the following specific examples are offered:

EXAMPLE 1—Part A

*Preparation of 3-(2,2,2-trichloro-1-hydroxyethyl)-5-methyloxazolidin-2-one*

In a flask equipped with stirrer, thermometer and gas outlet are introduced 75 g. of 1-amino-2-propanol and 60 g. of finely-divided urea. Stirring and heating are begun and continued for about 20 hours at a temperature gradually increasing from 125° to 180° C. An orange-yellow oily crude product is obtained and vacuum-distilled, first removing unreacted amino-alcohol and then collecting the product. The distilled product is a colorless material melting at 20°–22° C., having a refractive index at 24.5° C. of 1.4590 and the following elemental analysis:

| Element | Actual, Percent by Wgt. | Calculated, Percent by Wgt. |
|---|---|---|
| C | 47.31 | 47.5 |
| H | 6,975 | 6.97 | thus indicating preparation of the desired 5-methyloxazolidin-2-one.

100.0 ml. (1.0 mol) of chloral is added to 102 gm. of the thus-formed 5-methyloxazolidin-2-one with cooling to keep the reaction mixture below the reflux temperature of chloral. This reaction mixture is left at room temperature to solidify. A mixture of chloroform-petroleum ether (1:2) is added to the oily slurry and the product filtered by suction to obtain an orange, sticky solid; this is washed with carbon tetrachloride, which does not remove the orange tint completely, and dried on a suction filter. The resultant product weighs 85.8 gm., and has a melting point of 122°–130° C. Further recrystallization from carbon tetrachloride yields glistening white flakes, M.P. 134°–136° C. The following elemental analysis indicates the desired $C_6H_8Cl_3NO_3$ is obtained:

| Element | Actual, Percent by Wgt. | Calculated, Percent by Wgt. |
|---|---|---|
| C | 28.87 | 29.0 |
| H | 3.14 | 3.24 |
| Cl | 43.3 | 42.8 |

The thus-obtained 3-(2,2,2-trichloro-1-hydroxyethyl)-5-methyloxazolidin-2-one is less than 1/10% soluble in water, more than 1% soluble in acetone and less than 1/10% soluble in xylene.

EXAMPLE I—Part B

A tomato foliage disease test measures the ability of the product of Part A to protect tomato foliage against infection by the Early blight fungus, *Alternaria solani*. Tomato plants 5 to 7" high of the variety, Bonnie Best, are sprayed with 100 ml. of test formulations at 2000 p.p.m. and 400 p.p.m. test chemical in combination with 5% acetone, 0.01% Triton X-155, and the balance water at 40 pounds air pressure while being rotated on a turntable in a spray chamber. After the spray deposit is dry, the treated plants and comparable untreated controls are sprayed with a spore suspension containing approximately 20,000 conidia of *A. solani* per ml. The atomizer used delivers 20 ml. in a 30-second exposure period. The plants are held in a saturated atmosphere for 24 hours at 70° F. to permit spore germination and infection. After 2 to 4 days, lesion counts are made on the three uppermost fully-expanded leaves. Data, based on the number of lesions contained on the control plants, shows 48% and 42% control at the 2000 and 400 p.p.m. concentrations, respectively.

EXAMPLE I—Part C

Further fungicidal utility is demonstrated by the ability of the test compound to protect tomato plants against the Late blight fungus, *Phytophthora infestans*. The method employs tomato plants 5 to 7" high of the variety, Bonnie Best. 100 ml. of test formulations at concentrations of 2000 p.p.m. and 400 p.p.m. test chemical in combination with 5% acetone, 0.01 Triton X-155, and the balance water, are sprayed on the plants at 40 pounds air pressure while the plants are being rotated on a turn-table in a spray chamber. After the spray deposit is dry, the treated plants and comparable untreated controls are sprayed with a spore suspension containing approximately 150,000 sporangia of *P infestans*. The plants are held in a saturated atmosphere for 24 hours at 60° F. to permit spore germination and infection. After 2 to 4 days, lesion counts are made on the three uppermost fully-expanded leaves. Comparing the number of lesions on the test plants and control plants shows disease control of 67% at the 2000 p.p.m. concentration and 47% at the 400 p.p.m. concentration.

EXAMPLE I—Part D

Radish seeds are treated in Petri dishes with aqueous suspensions of the test chemical at 1000 and 100 p.p.m. (1000 or 100 p.p.m. test chemical, 5% acetone, 0.01% Triton X-155, balance water). 25 seeds are scattered in a dish containing filter-paper discs moistened with 5 ml. of the test formulation at each concentration. After 7 to 10 days under control conditions, it is observed that inhibition of germination of one half the seeds is accomplished at a concentration of 100 to 1000 p.p.m.

EXAMPLE I—Part E

To evaluate the effect of the test chemical upon the germination of seeds in soil, a mixture of seed of 6 crop plants is broadcast in 8″ x 8″ x 2″ metal cake pans filled to within ½″ of the top with composted greenhouse soil. The seed is uniformly covered with about ¼″ of soil and water. After 24 hours, 80 ml. of an aqueous test formulation containing the product of Part A, in amounts equivalent to 64 pounds per acre and 32 pounds per acre, is sprayed at 10 pounds air pressure uniformly over the surface of the pan. The seed mixture contains seeds of three broadleafs: turnip, flax, and alfalfa, and three grasses: wheat, millet, and rye grass. Two weeks after treatment, records are taken on seedling stand as compared to controls. Using this procedure, it is observed that at 32 pounds per acre stands of 50% and 20% on the broadleaf and grass varieties are obtained respectively.

EXAMPLE I—Part F

To demonstrate insecticidal activity of this invention, male German cockroaches, *Blattella germanica*, 8 to 9 weeks old are anesthetized with carbon dioxide to facilitate handling and then dipped in a test formulation (2000 p.p.m. product of Part A, 5% acetone, 0.01% Triton X-155, balance water) for ten seconds, removed, freed of excess liquids, and caged. Two lots of ten insects each are exposed to this formulation and mortality observations are recorded after 3 days. Using the product of Part A of this example at the above concentration, untreated controls exhibited 0% mortality whereas a 30% mortality re the test chemical is observed.

EXAMPLE II—Part A

*Preparation of 3-(2,2,2-trichloro-1-hydroxyethyl)-5-methylthiazolidine-2-thione*

Into a flask equipped with a stirrer, thermometer, and a dropping funnel are introduced 320 gm. (8 mol) of sodium hydroxide, 800 ml. of distilled water, and 1 gm. of ultrawet D.S. The flask and its contents are then cooled to a temperature of about 5° C., at which time 150 gm. (2 mol) of mono-isopropanolamine is added slowly with stirring. 304 gm. (4 mol) of carbon disulphide is added drop-wise to the continuously stirred reaction mixture over a period of 3 hours while the temperature is kept between 5°–10° C.

During the addition of the carbon disulphide the reaction mixture changes from colorless through orange to a deep red. After all the carbon disulphide is added, stirring is continued while the mixture is allowed to rise slowly to room temperature. The reaction mixture is then refluxed for 8 hours at about 45° C., kept at 80° C. for about 4 hours, and finally at 100° C. for another 4 hours, during which time the color of the reaction mixture changes from deep red through orange-red, yellow-orange to yellow. Crystals separate from the reaction mixture on standing and a second crystal crop is obtained by partially neutralizing the reaction mixture, using 100 ml. of concentrated hydrochloric acid.

46.0 gm. (0.33 mol) of the thus-obtained 5-methylthiazolidine-2-thione, M.P. 87.5°–88.5° C., is dissolved in about 120 ml. hot benzene, filtered, and 35 ml. (0.36 mol) chloral is added slowly, keeping the reaction mixture below the reflux temperature of the chloral, specifically about 40° C. After the chloral addition typically a maximum temperature of 52° C. is reached in about 10 minutes. The resultant clear yellow solution is allowed to cool until crystals form. Purification is typically carried out via filtering, washing with benzene, and drying at 50° C., leaving 75.7 gm. of yellow crystals, M.P. 103°–104° C. The yellow color present may be removed by trituration, using benzene. About 74.0 gm. of white crystals, M.P. 104°–105° C. results. The desired product is insoluble in water, and soluble in acetone. The following elemental analysis indicates the expected $C_6H_8Cl_3NOS_2$ is formed:

| Element | Actual, Percent by Wgt. | Calculated, Percent by Wgt. |
|---|---|---|
| C | 25.92 | 25.7 |
| H | 2.93 | 2.89 |
| Cl | 38.0 | 37.9 |

EXAMPLE II—Part B

Sport germination tests are conducted on glass slides via the test tube dilution method adopted from the procedure recommended by the American Pytopathological Society's Committee on Standardization of Fungicidal Tests. In this procedure the product of Part A of this example in aqueous formulation at concentrations of 1000, 100, 10 and 1.0 p.p.m. is tested for its ability to inhibit germination of spores from 7 to 10 day old cultures of *Monilinia fructicola*. These concentrations refer to initial concentrations before diluting 4 volumes with 1 volume of spore stimulant and spore suspension. Germination records are taken after 20 hours of incubation at 22° C. by counting 100 spores. Using this procedure it is observed that inhibition of germination of one half the spores is accomplished at a concentration of 100 to 1000 p.p.m.

EXAMPLE II—Part C

Using the procedure given in Example I, Part C, the product of Part A, Example II at both concentrations shows significant control.

EXAMPLE II—Part D

Phytotoxicity is evaluated by using tomato plants, variety Bonnie Best, 4 to 7″ tall and bean plants, variety Tendergreen. The plants growing in 4″ pots are treated by pouring a test formulation containing 250 mg. of the product of Part A, 5% acetone, 0.01 Triton X-155, and the balance water, on the soil. After 10 days, both the tomato and the bean plants are killed.

EXAMPLE II—Part E

To demonstrate defoliation using the product of Part A, bean plants growing in 4″ pots are used. Employing a soil drench technique, 37% defoliation is observed 10 days after treatment when a 200 pounds per acre dosage is used.

EXAMPLE II—Part F

Defoliation of bean plants using a spray is evaluated by exposing test plants to 800 ml. of the product of Part A of this example using a test formulation composing 6,400 p.p.m. test chemical, 1.0% methoxy polyethylene glycol 350, 5% acetone, 0.01% Triton X-155, and the remainder water. 14 days after treatment, 46% defoliation is observed.

EXAMPLE II—Part G

Using the seed germination test described in Example I, Part E, the product of Part A, Example II, receives ratings of 90% for the broadleaf species and 25% for the grass. In the latter, stunting also occurs.

EXAMPLE II—Part H

To evaluate pre-emergence herbicidal activity, the product of Part A of this example is applied to the soil in 5″ clay pots previously seeded with 20 seeds of wheat, 15 seeds of cotton and 20 seeds of radish. 50 ml. of a 2000 p.p.m. test formulation (2000 p.p.m. test chemical—5% acetone—0.01% Triton X-155—balance water) are applied as a drench to each pot. Pre-emergence herbicidal activity is shown in that all the seeds emerge on the untreated controls, however, in the test pots results show all the wheat seeds and all the radish emerge, but less than half the cotton seeds emerge.

EXAMPLE III—Part A

Preparation of 3-(2,2,2-trichloro-1-hydroxyethyl)-5-methyloxazolidine-2-thione 228 gm. mono-isopropanolamine is dissolved in 600 ml. of methanol and the mixture cooled in an ice bath to 0° C. 240 ml of $CS_2$ is then added to the resultant solution slowly with constant stirring. A solution of 190.5 gm. iodine in 1270 ml. methanol is added from a dropping funnel. The reaction mixture is then allowed to warm to room temperature after which solid needle-like crystals separate. The product is placed in a flask with 2 liters of water, gradually heated to boiling and acidified with dilute sulfuric acid. The solution is cooled and the sulfur which forms is filtered off. The filtrate is saturated with sodium chloride and from this solution part of the product separates as a solid.

This solid is removed by filtration, dissolved in benzene, and reprecipitated with petroleum ether. After drying, it has a melting point range from 65°–68° C. The product is then purified, resulting in 69.0 gm. of the desired 5-methyl-oxazolidine-2-thione, having a melting point range of 74°–76° C. 22.0 gm. (0.187 mol) of this material is dissolved in about 20 ml. hot benzene, filtered, allowed to cool and then 19.0 ml. (0.19 mol) chloral is added slowly. The temperature rises as the reaction occurs, and upon cooling of the reaction mixture crystallization occurs. The crystalline mass is chilled in cold water, filtered, and washed with cold benzene. This crude product weighs 51.6 gm. and after recrystallization, 48.7 gm. of white powder having a melting point of 117°–123° C. results. This material is insoluble in water, soluble in acetone, and insoluble in xylene. The following elemental analysis indicates preparation of the desired $C_6H_8Cl_3NO_2S$:

| Element | Actual, percent by Wt. | Calculated, percent by Wt. |
|---|---|---|
| C | 27.56 | 27.28 |
| H | 2.88 | 3.06 |
| Cl | 40.2 | 40.2 |

EXAMPLE III—Part B

Using the procedure given in Example II, Part H, the product of Part A, Example III has pre-emergence herbicidal selectivity also in that comparison with the aforementioned controls indicates almost all the wheat seeds emerge, whereas 75% of the cotton seeds and only 30% of the radish seeds emerge.

EXAMPLE III—Part C

Using the procedure given in Example I, Part B, the product of Part A of this example shows 78% control at 400 p.p.m.

EXAMPLE III—Part D

Using the procedure given in Example II, Part D, the product of Part A of Example III exhibits a phytotoxicity rating of 7, on a scale from 0= no injury to 11= plant killed, for tomato plants. The bean plants so treated are defoliated.

EXAMPLE III—Part F

Pre-emergent herbicidal activity is indicated through the procedure given in Example I, Part E. Results of this test are given in the following table:

| Pounds Per Acre | Est. Stand as Percent Compared to Check | |
|---|---|---|
| | Broadleaf | Grass |
| 8 | 100 | 15 (stunted) |
| 4 | 100 | 100 (stunted) |

EXAMPLE IV—Part A

Preparation of 3-(2,2,2-trichloro-1-hydroxyethyl)-thiazolidine-2-thione 30.0 gm. (0.25 mol) of thiazolidine-2-thione is wetted thoroughly with 5 ml. benzene and 25.0 ml. (0.25 mol) of chloral is added. The mixture evolves heat and a light yellow color develops. Solution first becomes complete and then crystallization occurs. Upon recrystallization of the product from chloroform, the desired pure product, M.P. 97°–98° C., weighing 56.0 gm. is obtained. It is desirable to exercise caution when recrystallizing due to possible decomposition. The following elemental analysis indicates the desired $C_5H_6Cl_3NO_2$ is obtained:

| Element | Actual, percent by Wgt. | Calculated, percent by Wgt. |
|---|---|---|
| C | 23.0 | 22.5 |
| H | 2.4 | 2.3 |
| Cl | 40.1 | 39.9 |

EXAMPLE IV—Part B

Using the spore germination evaluation procedure given in Example II, Part B, the product of this example inhibits germination of one half the spores of *Alternaria oleracea* at concentrations of 100 to 1000 p.p.m.

EXAMPLE IV—Part C

Using the procedure given in Example I, Part B, the product of Part A of this example exhibits significant control at a concentration of 2000 p.p.m.

EXAMPLE IV—Part D

Using the procedure given in Example I, Part C, ratings of 85% and 53% control at the 2000 p.p.m. and 400 p.p.m. concentrations respectively, are observed.

EXAMPLE IV—Part E

Using the seed germination test given in Example I, Part E, the product of Part A of Example IV gives results corresponding to 80% for the broadleaf and 40% for the grasses.

EXAMPLE IV—Part F

Using the procedure given in Example I, Part D, and substituting rye grass seeds for the radish seeds, the product of this example inhibits germination of one half the seeds at a concentration of 100 to 1000 p.p.m.

It is to be understood that although this invention has been described with specific reference to particular embodiments thereof, it is not to be so limited since changes and alterations therein may be made which are within the full intended scope of this invention as defined by the appended claims.

What is claimed is:

1. A compound of the formula:

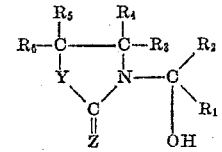

wherein Y and Z are selected from the group consisting of sulphur and oxygen; $R_1$ is selected from the group consisting of hydrogen and alkyl of no more than 4 carbon atoms; and $R_2$ is haloalkyl as derived from an alpha haloaldehyde and containing no more than 6 carbon atoms; $R_3$, $R_4$, $R_5$ and $R_6$ are selected from the group consisting of hydrogen, alkyl of no more than 10 carbon atoms, phenyl, benzyl, thienyl, tolyl, and xylyl.

2. 3-(2,2,2-trichloro-1-hydroxyethyl)-5-methyloxazolidin-2-one.

3. 3 - (2,2,2 - trichloro - 1 - hydroxyethyl)-5-methyl-thiazolidine-2-thione.

4. 3 - (2,2,2 - trichloro - 1 - hydroxyethyl)-5-methyl-oxazolidine-2-thione.

5. 3 - (2,2,2-trichloro-1-hydroxyethyl)-thiazolidine-2-thione.

6. The method of preparing a compound having the structure

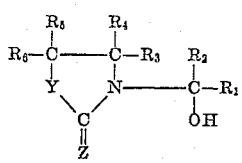

which comprises chemically reacting a compound having the structure

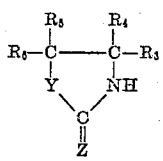

with a compound of the structure

wherein Y and Z are selected from the group consisting of oxygen and sulfur; $R_1$, $R_2$, $R_3$, $R_4$, $R_5$, and $R_6$ are selected from the group consisting of hydrogen atoms, alkyl radicals, aryl radicals, aralkyl radicals and alkaryl radicals, at least one of $R_1$ and $R_2$ being a haloalkyl radical, each of $R_1$, $R_2$, $R_3$, $R_4$, $R_5$ and $R_6$ containing no more than 10 carbon atoms.

7. The method according to claim 6 wherein the compound

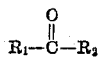

is butyl chloral.

8. The method of preparing 3-(2,2,2-trichloro-1-hydroxyethyl)-5-methyloxazolidin-2-one which comprises chemically reacting 5-methyloxazolidin-2-one with chloral.

9. The method of preparing 3-(2,2,2-trichloro-1-hydroxyethyl)-5-methylthiazolidine - 2 - thione which comprises chemically reacting 5-methylthiazolidine-2-thione with chloral.

10. The method of preparing 3-(2,2,2-trichloro-1-hydroxyethyl)-5-methyloxazolidine - 2 - thione which comprises chemically reacting 5-methyloxazolidine-2-thione and chloral.

11. The method of preparing 3-(2,2,2-trichloro-1-hydroxyethyl)-thiazolidine-2-thione which comprises chemically reacting thiazolidine-2-thione with chloral.

12. The method according to claim 6 wherein the compound

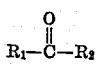

is chloral.

References Cited in the file of this patent

UNITED STATES PATENTS

| | | |
|---|---|---|
| 2,477,148 | Sheehan et al. | July 26, 1949 |
| 2,535,876 | Stewart | Dec. 26, 1950 |
| 2,553,770 | Vuttleson | May 22, 1951 |

OTHER REFERENCES

Elderfield, Heterocyclic Compounds, vol. 5 (1957) pp. 697–701.

UNITED STATES PATENT OFFICE

CERTIFICATION OF CORRECTION

Patent No. 2,973,366                        February 28, 1961

Russell M. Bimber

It is hereby certified that error appears in the above numbered patent requiring correction and that the said Letters Patent should read as corrected below.

Column 2, for that portion of Structure I, reading

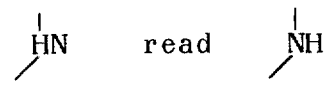

column 3, line 66, in the table, under the heading "Actual, Percent by Wgt." and opposite "H", for "6,975" read -- 6.975 --; column 6, line 12, for "Sport" read -- Spore --.

Signed and sealed this 1st day of August 1961.

(SEAL)
Attest:

ERNEST W. SWIDER                              DAVID L. LADD
Attesting Officer                                  Commissioner of Patents